United States Patent Office
3,812,069
Patented May 21, 1974

3,812,069
MAKING AQUEOUS SOLVENT MIXTURES OF ALKALI METAL SALT OF POLYAMIDE ACID
Edith M. Boldebuck, Schenectady, N.Y., assignor to General Electric Company, Schenectady, N.Y.
No Drawing. Filed May 28, 1971, Ser. No. 148,153
Int. Cl. C08g 20/32, 31/24; C23b 13/00
U.S. Cl. 260—29.2 M                     9 Claims

ABSTRACT OF THE DISCLOSURE

A method is provided for electrocoating aqueous mixtures of certain polyamide acid salts of alkali metal compounds, resulting from the neutralization of polyamide acid reaction products of organic anhydrides and organic diamines. The aqueous polyamide acid salt mixtures can be in the form of a solution or a dispersion. A method for making such materials also is provided.

---

The present invention relates to aqueous polyamide acid salt mixtures, a method for making them, and an electrocoating method using such materials.

It is generally known that polyamide acids can be electrocoated when employed with organic amines or ammonium compounds, as shown by Holub et al. Pat. 3,507,765, assigned to the same assignee as the present invention. Prior to the present invention, it was generally believed by those skilled in the art that neutralization of polyamide acids with alkali metal hydroxides, such as sodium hydroxide, could adversely affect the heat stability of polyimide films derived from such polyamide acid salts.

The belief that residual alkali metal ion in an organic resin can effect the break down of the resin is supported by the teaching of Brewer et al. Pat. 3,315,713, assigned to the same assignee as the present invention. Brewer et al. teaches, for example, that when alkali metal catalysts are employed in processing organo polysiloxane resins, that the alkali metal ion in the resin can adversely affect the heat stability of the resin. Further, in Izzard et al. Pat. 3,529,017, it is taught in particular instances, that polyimides can be reverted to organic dicarboxylic acids and organic diamines when treated with caustic soda.

As taught by the above Holub et al., and Brewer et al. patents, valuable results can be achieved when organic amines, or ammonium compounds are employed in polyamide acid mixtures, or in manufacturing organo polysiloxane resins. Cured resin films are provided having superior heat life stability. It is generally known that organic amines have unpleasant odors, and can contribute significantly to the costs of operation. Although ammonium compounds can be baked readily from resins after cure, prior to cure, these materials are often undesirable to work with due to their volatility and pungent odor.

The present invention is based on the discovery that when employed during the production of polyamide acids, alkali metal compounds, such as sodium hydroxide, potassium hydroxide, etc. can be employed at up to neutralizing amounts without detrimental results. Surprisingly, if the alkali metal base is employed at up to neutralizing concentrations, electrodeposited polyimide films can be made exhibiting substantially the same heat stability as polyimide films made from polyamide acid mixtures employing organic amines, or ammonium compounds. As a result, the present invention provides a more convenient and economical method for making polyamide acid salt mixtures, which can be electrodeposited onto various substrates to impart improved surface characteristics thereto.

There is provided by the present invention, a process for preparing a polyamide acid salt composition involving the interaction of organic carboxylic anhydride and organic diamine, in the presence of organic solvent, to provide for the production of polyamide acid, wherein an amount of base is employed to convert polyamide acid values to polyamide acid salt values, involving the improvement which comprises employing an alkali metal compound as the base, where the organic anhydride is a member selected from haloformylphthalic anhydride, benzophenone dianhydride, pyromellitic dianhydride, ethylene glycol bis-trimellitate anhydride, and the organic diamine is selected from the class consisting of $C_{2-8}$ alkylene diamines, metaphenylene diamine, bis-aminosilanes, amine terminated polydiorganosiloxanes, and diamines having the formula,

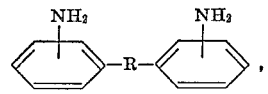

where R is a divalent radical selected from the class consisting of $C_{1-3}$ alkylene,

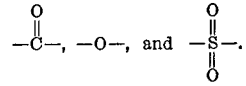

Included by the alkali metal compounds which can be employed in the practice of the invention, are hydroxides of the alkali metals, for example, sodium hydroxide, potassium hydroxide, lithium hydroxide, cesium hydroxide, and rubidium hydroxide, and alkali metal salts of weak acid, such as sodium carbonate, potassium carbonate, sodium bicarbonate, other alkali metal carbonates and bicarbonates, alkali metal borates, alkali metal salts of weak acids having a Ka of $10^{-7}$ or less at 25° C. in water.

Some of the organic diamines which can be employed in the method of the present invention, are for example, alkylene diamine, for example, ethylene diamine, trimethylene diamine, hexamethylene diamine, etc. Various diaminobenzenes such as meta phenylene diamine, and diamines, such as para oxydianiline, meta oxydianiline; alkylene dianilines, such as methylene dianiline, ethylene dianiline; the various ortho, meta and para isomers of diamino benzophenone, etc., and various ortho, metal and para isomers of sulfonyl dianiline,

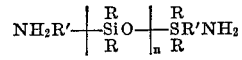

where n has an average value of 1 to 20, R is a monovalent radical, such as methyl, phenyl or a mixture, and R′ is a divalent hydrocarbon radical having from 1–16 carbon atoms. Of the aforementioned organic diamines, metaphenylene diamine, ethylene diamine, hexamethylene diamine, 4,4′-oxy dianiline, 4,4′-methylene dianiline, and 4,4′-sulfonyl dianiline are preferred.

Organic solvents which can be employed are solvents such as, N,N-dimethylformamide, N,N-dimethylacetamide, N,N-diethylformamide, N,N-diethylacetamide, N,N-dimethylmethoxy acetamide, N-methyl caprolactam, dimethylsulfoxide, N-methyl - 2 - pyrrolidone, tetramethyl urea, pyridine, dimethylsulfone, hexamethylphosphoramide, tetramethylene sulfone, formamide, N-methylformamide, N-acetyl-2-pyrrolidone, and diluents such as benzene, dioxane, xylene, toluene, cyclohexane, alcohol, glycols, etc.

In the practice of the invention, the organic anhydride and the organo diamine are reacted in the presence of a suitable organic solvent under substantially anhydrous conditions, while the temperature of the mixture is maintained below imidization temperatures, such as below 150° C. Depending upon whether the organic anhydride is an organic monoanhydride, or an organic dianhydride, the molar amounts of the organic anhydride, and the organic diamine can vary. Effective results are achieved if substantially a stoichiometric equivalence is maintained during the formation of polyamide acid, between functions of organic anhydride functionality and organo amine functionality. In making the polyamide acid, the moles of haloformyl mono-organoanhydride required with organodiamines substantially equivalent to the mole of organodianhydride employed with organodiamine.

After the polyamide acid has formed, which can be readily determined by following the viscosity of the solution, the alkali metal hydroxide can be added to the mixture to effect the neutralization of available carboxy radicals. In instances where total carboxy content in the mixture is not known, a standard base titration of the mixture can be performed.

After the polyamide acid has been at least partially converted to polyamide acid salt, water can be added to the mixture in any desired amount up to 95% by weight. For example, depending upon the nature of the polyamide acid, aqueous mixtures in the form of solutions or dispersions, can be made by this procedure having a solids content of from 0.5% to 15%, and water in an amount sufficient to render the mixture electroconducting, and up to 95% by weight of the mixture, while preferably present at from 25% to 75%.

In particular instances, for example, when the polyamide acid is made by reacting trimellitic, anhydride with organic diamine which can be advantageously achieved by utilizing the trimellitic anhydride as chloroformalphthalic anhydride and organic diamine, the resulting polyamide acid can have residual amounts of chloride ion present which can be detrimental to the results desired if electrocoated onto certain metallic substrates, such as a copper or aluminum wire. Residual chloride ion, for example, has been found to cause corrosion of the electrode. It has been found that chloride ion can be removed by treating the polyamide acid with an ion exchange resin prior to its conversion to the polyamide acid salt state. Among the anion exchange resins which can be utilized, are for example, weakly basic resins in the hydroxy form, such as Amberlite/R-45, etc.

The aqueous polyamide acid salt compositions of the present invention can be utilized in conventional electrocoating, or dip-coating procedures to provide for copper and aluminum substrates having temperature resistant polyimide films exhibiting extended heat service life.

In order that those skilled in the art will be better able to practice the invention, the following examples are given by way of illustration and not by way of limitation. All parts are by weight.

EXAMPLE 1

Equal molar amounts of benzophenone tetracarboxylic acid dianhydride and methylene dianiline were dissolved in dry N-methyl pyrrolidone and allowed to react to room temperature. Based on method of preparation, there was obtained a high molecular weight polyamide acid solution having 15% solids.

There was added to 20 parts of the above polyamide acid solution, 1.44 meq. of sodium hydroxide as a 1 N solution in water followed by 20 parts of N-methyl pyrrolidone. A homogeneous mixture was obtained upon the addition of a small amount of water, which was continued until a portion of the polymer had precipitated. There was obtained a stable dispersion of the resulting polyamide acid salt having about 5% solids. The ratio of gram atoms of sodium, to carboxy radicals, in the resulting mixture had a value of about 0.125.

The above polyamide acid salt mixture was electrocoated using a copper foil anode and a platinum cathode. After 1 minute utilizing a 40 ma. constant DC current, there was obtained 0.142 part of a wet deposit on the copper anode. The copper anode was then heated at 250° C. for 5 minutes to effect the removal of solvent. There was obtained a glossy, well fused, flexible film having a solids weight of .0462 part. The film is aged at 300° C. for 13 weeks. A similar film made from the same polyamide acid mixture, utilizing ammonia hydroxide in place of sodium hydroxide, is found to experience substantially the same weight loss.

EXAMPLE 2

The procedure of Example 1 is repeated except that in place of sodium hydroxide there is employed potassium hydroxide as the alkali metal hydroxide.

A series of electrodepositions were made on aluminum foil anodes from the above described composition, and a composition made by the same method utilizing ammonium hydroxide in place of potassium hydroxide. There was employed a 40 ma. constant current for 1 minute. The respective aluminum foil anodes were then heated for 1 hour at 250° C. to produce polyimide films having essentially the same constant weight. Both of the films were smooth, yellow, were approximately 0.7 mil thick and very adherent to the aluminum foil. The exact weight of the film was then determined after the aluminum foil was heated in an air circulating oven, operated at ambient humidity at a temperature between 250° C.-300° C. After 13 weeks, at a temperature of 250° C., the flexibility of the films were found to be excellent and neither film cracked or lost adhesion to the aluminum, while the strip was bent 180° and creased. Both films had a 5% weight loss when measured afer 13 weeks at 250° C. After 13 weeks at a temperature of 300° C., the weight loss of the film derived from the polyamide acid potassium salt was about 17%, as compared to a 16% weight loss from the film derived from the polyamide acid ammonium salt. In addition, both films showed excellent adherence to the above substrate.

EXAMPLE 3

A poly(amide-acid-imide) having chemically combined units of the formula,

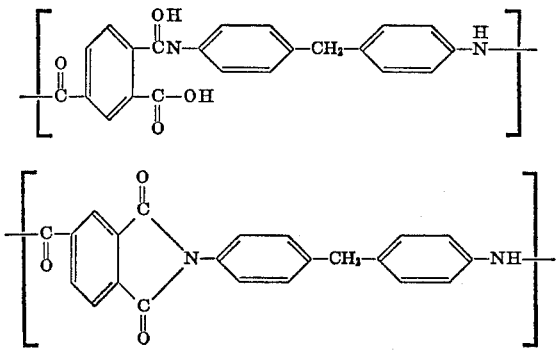

was found by potentiometric titration to contain 1.29 meq. of acid groups, per gram of polymer solids. A solution was prepared by dissolving 202 parts of the polymer in 808 parts of N-methyl pyrrolidone.

There was added 43.3 parts of N-methyl pyrrolidone to 25 parts of the above solution of poly(amide-acid-imide). There was added to the resulting solution 6.45 meq. of sodium hydroxide in the form of 1 N aqueous solution, which was the amount calculated to exactly neutralize the free acid groups of the poly(amide-acid-imide). Water was then added to the mixture with stirring, until the resulting mixture had a total of 33.72 parts.

There was placed in the above mixture, an aluminum foil anode which was immersed to give a total immersed surface area of 2 square inches. A 40 milliamp constant current was passed through the mixture for 1 minute. There was obtained an electrodeposit having a weight of 0.192. After the composite was heated for 1 minute at 125° C. and 5 minutes at 280° C., the weight of cured polymer film was 0.0182 part. The film was yellow, glossy, flexible to the aluminum, and adherent; it had a thickness of about 0.5 mil.

EXAMPLE 4

An electrocoating composition was prepared by adding sodium hydroxide to an N-methyl pyrrolidone solution of a poly(amide-acid-imide) of Example 3, utilizing enough sodium hydroxide to neutralize only 60% of available carboxy radicals. There was obtained a milky suspension consisting of 5 parts of solids, 31.7 parts of N-methyl pyrrolidone, 63.3 parts of water, and 3.78 meq. of sodium hydroxide.

The above mixture was electrocoated employing the same conditions as described in Example 3. There was deposited a dry weight of 0.035 part of film after the aluminum anode was heated for 1 minute at 125° C. and 5 minutes at 250° C. The resulting film exhibited valuable insulating characteristics.

EXAMPLE 5

The poly(amide-acid-imide) of Example 3, was found to contain 250 p.p.m. of chloride ion, by titration with a standard silver nitrate solution. The chloride ion was removed by treating the polyamide acid with anion exchange resin, utilizing a stock solution of 20% solids of the poly-(amide-acid-imide) in N-methyl pyrrolidone. There was added 80 parts of a weakly basic anion exchange resin of a polystyrene amine type in the hydroxyl form to 1,000 parts of the aforementioned stock solution. The anion exchange resin had an exchange capacity of 3.47 meq./g. Effective results were achieved by stirring the resin in the stock solution for 2 hours at room temperature, and then filtering the mixture through a glass wool plug to remove the anion exchange resin. A clear amber colored polymer solution was obtained.

Electrocoating solutions "A" and "B" were prepared from solutions of the above described poly(amide-acid-imide). Solution A contained chloride ion and solution B was substantially free of chloride ion as a result of treatment with the anion exchange resin. There was added to these solutions enough sodium hydroxide to neutralize 61% of available carboxy radicals to produce electrocoating compositions having about 5% polymer solids, about 47½% N-methyl pyrrolidone and about 47½% water. Electrocoating composition A contained 11 p.p.m. of chloride ion and B contained 0.3 p.p.m. of chloride ion. These compositions were in the form of suspensions with relatively small amounts of precipitated polymer phase.

The above electrocoating compositions were employed to prepare compositions of aluminum and polyimide by immersing aluminum foil anodes into the respective mixtures. During the electrocoating of the compositions, there was employed 40 ma. current for 1 minute. The aluminum content of the electrodeposited polyamide acid from the respective compositions were also determined after removing a wet polymer deposit with dimethyl formamide.

The following results were obtained from electrocoating compositions A and B.

| | Part of cured film | Properties of film | Aluminum transfer into polymer (wt. percent) |
|---|---|---|---|
| A | .0313 | Yellow, rough, hazy | .58 |
| B | .0292 | Yellow, smooth, transparent | .02 |

After 30 days at room temperature, it was found that the weight of wet film obtained by electrocoating was substantially the same in both samples, establishing that electrocoating compositions partly neutralized with sodium hydroxide did not deteriorate with age. The above results show, however, that the presence of small amounts of chloride ion has a significant effect on the quality of cured polymer film deposited on aluminum. The removal of chloride ion also greatly improves the nature of the cured film by reducing transport of aluminum ion into the electrodeposit.

EXAMPLE 6

There was added 8.2 parts of a 0.39 molal sodium ethoxide solution in ethanol to a 9½% by weight solution of a poly(amide-imide) containing 1.29 meq. of acid groups per gram of polymer dissolved in dimethyl sulfoxide, where the poly(amide-imide) had chemically combined units of the formula,

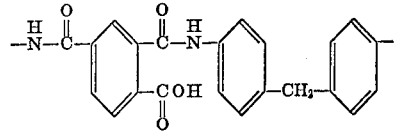

There was added to the resulting mixture, 39.3 parts of water to produce a composition having a ratio of about 0.5 moles of sodium ethoxide per mole of carboxy.

The above mixture was electrocoated onto an aluminum anode using a current density of 20 ma./sq. inch for 1 minute. There was obtained a flexible polyamide imide coating after the electrodeposit was cured at 250° C., which had a thickness of 0.9 mil. The film exhibited superior heat stability over an extended period of time.

EXAMPLE 7

A polyamide acid was prepared by reacting at room temperature, 1.104 parts of pyromellitic dianhydride and 1.058 parts of oxydianiline in 18.27 parts of dry-N-methyl pyrrolidone. There was obtained a high molecular weight polyimide containing about 10.6 weight percent polymer in the amide acid form.

There was added 33.8 parts of N-methyl pyrrolidone to 18.2 parts of the above solution. There was then added with stirring, 8.15 parts of a 0.708 molal solution of sodium phenoxide in methanol, and 14.29 parts of water. There was obtained a composition having a ratio of about 0.63 moles of sodium phenoxide per mole of carboxy.

An aluminum anode was employed as an electrode in the above composition employing a 40 ma. constant current for 1 minute. The electrodeposit was cured to produce a polyimide coating weighing about 0.004 part and having superior temperature resistance, and valuable insulating properties.

EXAMPLE 8

There was added to 5.126 parts of benzophenone tetracarboxylic acid dianhydride, a solution in N-methyl pyrrolidone of 2.518 parts of methylene dianiline and 0.881 part of bis(4-butylamino, dimethylsiloxane). The resulting mixture was stirred at room temperature until a clear polymer solution was obtained having about 20% solids. There was added to 12½ parts of the solution, 21.7 parts of N-methyl pyrrolidone and about 9½ parts of a 0.49 molar solution of aqueous sodium bicarbonate. To the resulting compositions, there was added about 7½ parts of water, resulting in the production of a clear solution having a ratio of about 0.5 moles of sodium bicarbonate, per mole of carboxy.

The mixture was electrocoated for 1 minute utilizing a nickel anode and a constant 40 ma. current. The electrodeposit was cured at 250° C. to produce a flexible adherent polyimide coating approximately 0.2 mil thick, and exhibiting superior heat stability and valuable insulating properties.

EXAMPLE 9

A polyamide acid was made by effecting reaction in substantially anhydrous N-methyl pyrrolidone between equal molar amounts of 4,4'-ethylene bis-anhydrotrimellitate and methylene dianiline at room temperature. There was obtained a solution of a polyester imide in the amide acid form, having about 15% by weight solids.

There was added to 16.67 parts of the above solution, 17.5 parts of N-methyl pyrrolidone and 0.83 parts of a 1 molar aqueous solution of sodium carbonate with stirring. To the resulting mixture there was added slowly 15 parts of water. There was obtained a solution having about 0.1 moles of sodium carbonate per mole of carboxy.

An electrodeposit was obtained from the above solution utilizing a 1 square inch aluminum anode and a 40 ma. constant current over a period of 1 minute. There was obtained a smooth adherent ester imide coating having a 0.7 mil thickness after a 5 minute cure of electrodeposit at 250° C. When the aluminum foil was bent and creased, there was no evidence of cracking. The film exhibited superior heat stability and valuable insulating properties.

EXAMPLE 10

A polyamide acid was made by effecting reaction between pyromellitic dianhydride and a mixture of organic diamines. There was added 76.85 parts of a N-methyl pyrrolidone solution containing about 2.92 parts of methylene dianiline and about 1.59 parts of metaphenylene diamine to 6.098 parts of pyromellitic dianhydride. After approximately 2 hours with stirring at room temperature, there was obtained a clear viscous solution having about 12½% by weight of solids of the resulting polyamide acid.

Ten parts of the above solution was diluted with 12.9 parts of N-methyl pyrrolidone. There was added to the resulting mixture, 0.0924 part of sodium metaborate tetrahydrate dissolved in water with stirring. Additional water was then added to the mixture to produce a total of 26.1 parts of water. The resulting mixture had a molar ratio of about 0.1 moles of sodium metaborate per mole of carboxy. Utilizing an aluminum anode for a period of 1 minute and a current of 40 ma. an electrodeposit was formed on the aluminum surface. After heating for 5 minutes at 250° C. there was obtained a smooth glossy polyimide coating having a thickness of 0.35 mils exhibiting superior heat stability and valuable insulating characteristics.

Although the above examples are limited to only a few of the very many electrocoating compositions which can be made by the method of the present invention, it should be understood that the present invention is directed to compositions comprising a much broader class of polyamide acids resulting from reaction between organic anhydrides and organic diamines as defined in the description preceding these examples.

What I claim as new and desire to secure by Letters Patent of the United States:

1. In a process for preparing a polyamide acid salt composition involving the interaction of organic carboxylic anhydride and organic diamine in the presence of an organic solvent to produce a polyamide acid, and the employment of up to neutralizing amounts of a base to form an aqueous solvent mixture and effect the conversion of polyamide acid groups to polyamide acid salt groups, the improvement of employing an alkali metal compound as the base.

2. A process in accordance with claim 1, where sodium hydroxide is employed as the alkali metal compound.

3. A process in accordance with claim 1, wherein potassium hydroxide is employed as the alkali metal compound.

4. A process in accordance with claim 1, where the polyamide acid is made by interacting benzophenone dianhydride and 4,4'-methylene dianiline.

5. A process in accordance with claim 1, where the polyamide acid is made by effecting reaction between chloroformylphthalic anhydride and an organic diamine.

6. A process in accordance with claim 1, where the organic diamine comprises an amine terminated polydiorganosiloxane.

7. A process in accordance with claim 1, where the organic carboxylic anhydride is 4,4'-ethylene bistanhydrotrimellitate.

8. A method for making a polyamide acid in accordance with claim 5, where the polyamide acid reaction mixture is treated with a weakly basic anion exchange resin.

9. A method for making a polyamide acid salt in accordance with claim 8, where an alkali metal hydroxide is employed in up to neutralizing amounts with the anion exchange resin-treated polyamide acid.

References Cited
UNITED STATES PATENTS

| | | | |
|---|---|---|---|
| 3,453,236 | 7/1969 | Culbertson | 260—29.2 N |
| 3,190,856 | 6/1965 | Lavin et al. | 260—78 TF |
| 3,073,784 | 1/1963 | Endrey | 260—78 TF |
| 3,282,897 | 11/1966 | Angelo | 260—78 TF |
| 3,528,937 | 9/1970 | Reynolds et al. | 260—29.2 N |
| 3,507,765 | 2/1970 | Holub et al. | 260—29.2 N |
| 3,340,172 | 9/1967 | Huggard | 260—29.2 N |
| 3,355,373 | 11/1967 | Brewer et al. | 204—181 |
| 3,179,631 | 4/1965 | Endrey | 260—29.2 N |

MURRAY TILLMAN, Primary Examiner

A. H. KOECKERT, Assistant Examiner

U.S. Cl. X.R.

204—181; 260—29.2 N, 46.5 E, 78 TF